May 31, 1955 H. L. DIXON ET AL 2,709,277
APPARATUS FOR CURING BELTS
Filed Jan. 6, 1951
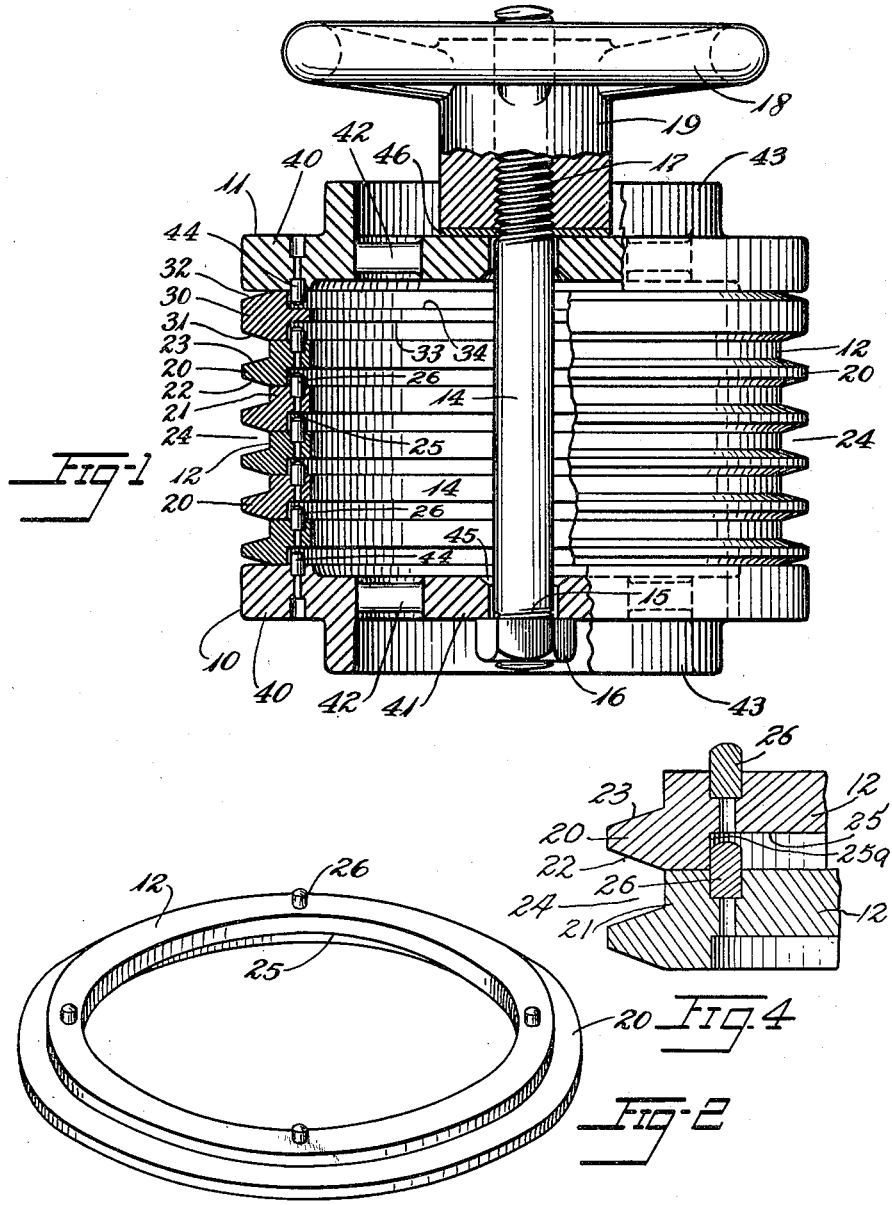
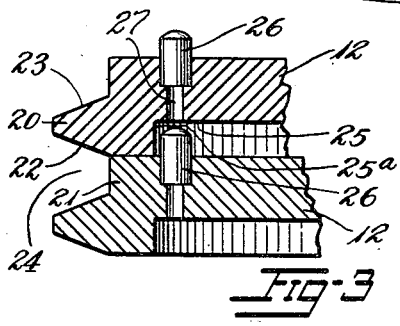
Inventors
Henry L. Dixon
David G. Hunt
By
Atty.

United States Patent Office 2,709,277
Patented May 31, 1955

2,709,277

APPARATUS FOR CURING BELTS

Henry L. Dixon, Cuyahoga Falls, and David G. Hunt, Akron, Ohio, assignors to The B. F. Goodrich Company, New York, N. Y., a corporation of New York Application January 6, 1951, Serial No. 204,807

4 Claims. (Cl. 18—34)

This invention relates to apparatus for curing belts and is especially useful in curing endless V-belts of reinforced rubber material.

In the manufacture of endless V-belts such belts have been cured by mounting them in grooves about a circumferentially grooved drum and wrapping the exposed faces of the drum with cloth wrappings to apply pressure thereto. Where the belts have been non-stretchable the drums have sometimes been made up of a plurality of mold rings held in assembled relation by bolts or other fastening means, the assembled rings providing molding grooves between them open to the outer face of the drum. Such rings have been provided with telescoping annular shoulders to hold them in proper relation. Difficulties have been encountered in the use of such mold rings in that the telescoping shoulders provided a parting surface between the rings stepped in cross-section which entrapped moisture and were highly subject to corrosion. The corroded material of the rings adhered to and built up the faces between the rings especially in the corners thereof, so that the belt molding grooves were changed in dimension. It was difficult to clean the ring faces and this also contributed to the damage due to corrosion. The rapid corrosion of the rings resulted in short life of the rings.

Such rings were also difficult to separate. Prodding slots were provided but when the rings were assembled with the slots out of alignment, prodding tools could not be entered in the slots.

It is an object of the present invention to overcome the foregoing and other difficulties.

Other objects are to reduce corrosion of the mold rings, to facilitate cleaning of the rings, to provide improved means for centering the rings upon each other, to provide for ready replacement of the centering means, to facilitate breaking apart of the mold rings, to provide greater bearing surface between the rings, to reduce the weight of the rings, and to provide ready escape of entrapped air, water, or steam.

These and other objects will appear from the following description and the accompanying drawings.

Of the drawings,

Fig. 1 is a view partly broken away and partly in section, of an assembled curing drum constructed in accordance with and embodying the invention.

Fig. 2 is a perspective view of one of the curing rings thereof.

Fig. 3 is an enlarged cross-section view showing two adjacent rings.

Fig. 4 is an enlarged fragmentary sectional view similar to Fig. 3 but with the section taken through the locating pins to illustrate the contact thereof with an adjacent ring.

Referring to the drawings, a pair of similar end plates 10, 11 are provided between which a plurality of mold rings 12 of similar construction are clamped by a bolt 14 having a threaded portion 15 at one end engaged by a nut 16 and a threaded portion 17 at its other end engaged by a hand wheel 18 having a threaded hub 19.

Each ring 12 has a circumferential flange 20 and adjacent thereto a shoulder 21. The flange has conical side faces 22, 23 and opposed side faces of adjacent rings define an annular groove 24 for molding a V-belt. Each ring 12 also has an annular recess or rabbet 25 adjacent its inner periphery at the side opposite the shoulder 21. A set of spaced-apart dowel pins 26 are seated in sockets formed in the shoulder of the ring and project into the rabbet of the adjacent ring in contact with the inner peripheral surface 25a of the shoulder of the rabbet (see Fig. 4) to center the rings with respect to each other. It will be noted that this peripheral surface 25a which co-acts with the dowel pins 26 to center the rings, permits this centering regardless of the orientation of the rings, in the circumferential direction, and that this centering is effected by localized contact of the pins with the annular surface.

The pins 26 are of hardened metal and are replaceable, being pressed into their sockets. A clearance opening 27 is provided through the ring in line with each socket through which a punch may be inserted for driving the pins for removal thereof.

While it is preferred to construct the surface 25a of cylindrical shape, this surface may be conical or other shape in cross-section if desired, provided that it provides a surface of revolution for engaging the pins. Also although the locating surface is shown as an inner peripheral surface, it is within the invention to face the surface outwardly. The pins 26 are preferably made of round cross-section and removable but may be fixed and of other shapes. They provide locating projections at spaced intervals for centering the adjacent ring. It will be noted that the meeting faces of the rings are free from steps, they are readily cleaned and easily drained so that corrosion is reduced and collection of corroded material is substantially eliminated. As the meeting faces extend as continuous surfaces to the exterior of the rings, draining of moisture and escape of entrapped air is facilitated. As the rings practically make line contact with the dowel pins and many assemblies of a pair of rings are possible without contact of a pin with the same spot on a ring, wear is confined substantially to the pins, which may be readily replaced.

One dummy ring 30 is provided at an end of the stack to complete the last mold groove. It has two opposite conical molding faces 31, 32 and two annular rabbets 33, 34 at opposite sides thereof and is therefore reversible enabling either side of it to be faced either way.

The end plates 10, 11 are preferably of similar wheel-like construction each having a rim 40 and hub 41 connected by spokes 42. A ring 43 is secured to the spokes as by welding and serves to clear the nut 16 and to provide a rest for the plate 10 in assembling the stack. The plates have dowel pins 44 for engaging and aligning an adjacent mold ring. The plates are duplicates of each other as in assembling and disassembling it is convenient to be able to use a plate first at the bottom and in a succeeding operation as the top plate as this facilitates loading and unloading of the belts with a minimum consumption of time and effort.

The wheel-like construction of the end plates provides for circulation of steam in contact with the inner faces of the mold rings and prevents trapping of condensed water. The clearance holes for the bolt 14 are chamfered, as at 45 to facilitate entry of the bolt. A friction reducing washer 46 may be provided below the hand wheel 18.

In using the apparatus, the plate 10 may be laid on a table and rings 12 and uncured belts may be stacked alternately thereon. In placing the rings 12 these may be assembled in any rotative position as the locating pins engage the shoulder at any position of the rings and the space between the pins provides for prodding the rings apart. As the plates 10 and 11 are interchangeable either one may be used to support the stack. The dummy ring 30 and plate 11 are then applied and the bolt 14 and hand wheel 18 are applied to secure the stacked rings together. A suitable wrapping, as of cloth, is then applied under tension about the periphery of the assembly over the belts to bind them in the grooves. The mold is then placed in an open steam vulcanizer and steam under pressure is applied to cure the belts.

Variations may be made without departing from the scope of the invention as it is defined by the following claims.

We claim:

1. An apparatus for curing endless V-belts comprising a plurality of mold rings each having a radially extending planar surface on each side face thereof for abutting engagement with adjacent rings, inclined circumferentially extending molding surfaces on adjacent rings cooperating to provide belt receiving grooves, a plurality of circumferentially spaced elements extending axially from one of said planar surfaces of a ring of each pair of adjacent rings, and an axially extending surface of circular cross-section on the other ring of an adjacent pair thereof and concentric with the axis of the ring, the shape and positions of said elements being such that they each engage the last-mentioned surface in substantially line contact and axially align the adjacent rings when the latter are placed in abutting engagement.

2. An apparatus for curing endless V-belts comprising a plurality of annular mold rings each having a belt molding surface and a flat annular surface offset radially from said molding surface and extending at substantially right angles to the axis of the ring, the rings fitting together side to side with the flat annular surfaces of the rings registering with each other in abutting contact, a plurality of circumferentially spaced cylindrical pins projecting axially from the flat surface of one of the rings of a pair thereof, a cylindrical annular recess in the annular abutting surface of the other ring of the pair thereof to receive the projecting pins, the diameter of a circle circumscribed about said pins being equal to the diameter of said recess whereby the pins simultaneously engage the inner periphery of the annular recess in an adjacent ring to locate the rings in co-axial alignment with each other.

3. An apparatus for curing endless V-belts comprising a plurality of annular mold rings each having a belt molding surface, a flat annular radially extending surface along one side of each ring and extending at substantially right angles to the axis of the ring, said rings fitting together side to side with the flat annular surfaces of the rings registering with each other in abutting contact, a plurality of elongated elements circumferentially spaced apart from each other and projecting axially from the flat surface of one of the rings of a pair thereof, and a continuous surface of circular cross section concentric with the axis of the other ring of a pair thereof and extending axially from the annular surface of the said other ring, the diameter of said axially extending surface being such that the latter engages each of said elements in substantially line contact when the rings are assembled together in mating relation.

4. The apparatus of claim 3 in which the elongated elements are removably mounted to the ring from which they project to facilitate the replacement of the elements after they have been worn.

References Cited in the file of this patent

UNITED STATES PATENTS

| 271,496 | McClelland | Jan. 30, 1883 |
| 343,309 | Halstead | June 8, 1886 |
| 940,208 | Southerland | Nov. 16, 1909 |
| 1,354,738 | Gates | Oct. 5, 1920 |
| 1,605,358 | Louisot | Nov. 2, 1926 |
| 1,748,626 | Waner | Feb. 25, 1930 |
| 1,910,525 | Dempsey | May 23, 1933 |
| 2,611,151 | Carter et al. | Sept. 23, 1952 |

FOREIGN PATENTS

| 1,268 | Great Britain | Jan. 24, 1890 |